US012126638B2

(12) United States Patent
Mammadli et al.

(10) Patent No.: US 12,126,638 B2
(45) Date of Patent: *Oct. 22, 2024

(54) SYSTEMS AND METHODS OF ADAPTIVELY IDENTIFYING ANOMALOUS NETWORK COMMUNICATION TRAFFIC

(71) Applicant: ROYAL BANK OF CANADA, Toronto (CA)

(72) Inventors: Nariman Mammadli, Toronto (CA); Atanas Viyachki, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 723 days.

This patent is subject to a terminal disclaimer.

(21) Appl. No.: 17/386,295

(22) Filed: Jul. 27, 2021

(65) Prior Publication Data

US 2021/0360015 A1 Nov. 18, 2021

Related U.S. Application Data

(63) Continuation-in-part of application No. 17/033,232, filed on Sep. 25, 2020, now Pat. No. 11,627,153.

(Continued)

(51) Int. Cl.
*H04L 9/40* (2022.01)
*G06F 18/21* (2023.01)

(52) U.S. Cl.
CPC ........ *H04L 63/1425* (2013.01); *G06F 18/217* (2023.01); *H04L 63/1416* (2013.01); *H04L 63/145* (2013.01); *H04L 63/1466* (2013.01)

(58) Field of Classification Search
CPC ............ H04L 63/1425; H04L 63/1416; H04L 63/1433

(Continued)

(56) References Cited

U.S. PATENT DOCUMENTS 8,682,812 B1 * 3/2014 Ranjan .................. H04L 43/028
706/12
11,003,773 B1 * 5/2021 Fang ...................... G06N 20/00

(Continued)

OTHER PUBLICATIONS

United States Patent and Trademark Office, Notice of Allowance for U.S. Appl. No. 17/033,232 dated Dec. 7, 2022.

*Primary Examiner* — Badrinarayanan
(74) *Attorney, Agent, or Firm* — NORTON ROSE FULBRIGHT CANADA LLP

(57) ABSTRACT

Systems and methods for adaptively identifying anomalous network communication traffic. The system includes a processor and a memory coupled to the processor. The memory includes processor-executable instructions that configure the processor to: obtain data associated with a sequence of network communication events; determine that the sequence of communication events is generated by a computing agent based on a symmetricity measure associated with the sequence of network communication events; generate a threat prediction value for the sequence of network communication events prior-generated by the computing agent based on a combination of the symmetricity measure and a randomness measure associated with the network communication events; and transmit a signal for communicating that the sequence of network communication events is a potential malicious sequence of network communication events based on the threat prediction value.

18 Claims, 8 Drawing Sheets

Related U.S. Application Data

(60) Provisional application No. 62/905,735, filed on Sep. 25, 2019.

(58) Field of Classification Search
 USPC ............................................................ 726/22
 See application file for complete search history.

(56) References Cited

U.S. PATENT DOCUMENTS

| | | | |
|---|---|---|---|
| 2010/0107254 A1* | 4/2010 | Eiland ................. | H04L 63/1416 726/23 |
| 2011/0067106 A1* | 3/2011 | Evans ................... | G06F 21/552 709/224 |
| 2015/0215334 A1* | 7/2015 | Bingham ............ | H04L 63/1425 726/23 |
| 2018/0013772 A1* | 1/2018 | Schmidtler ........... | H04L 63/145 |
| 2019/0044963 A1* | 2/2019 | Rajasekharan ........ | G06N 20/00 |
| 2019/0356679 A1* | 11/2019 | Sites ................... | H04L 63/1416 |
| 2022/0174511 A1* | 6/2022 | Kvernvik ............. | H04W 24/08 |

\* cited by examiner

SYSTEMS AND METHODS OF ADAPTIVELY IDENTIFYING ANOMALOUS NETWORK COMMUNICATION TRAFFIC

CROSS REFERENCE TO RELATED APPLICATIONS

This application is a continuation-in-part of co-pending U.S. patent application Ser. No. 17/033,232, entitled "SYSTEMS AND METHODS OF ADAPTIVELY SECURING NETWORK COMMUNICATION CHANNELS", filed on Sep. 25, 2020, and claims all benefit, including priority, of that and of U.S. provisional patent application No. 62/905,735, entitled "SYSTEMS AND METHODS OF ADAPTIVELY SECURING NETWORK COMMUNICATION CHANNELS", filed on Sep. 25, 2019, the entire contents of which are hereby incorporated by reference herein.

FIELD

Embodiments of the present disclosure generally relate to the field of network communications, and in particular to systems and methods for adaptively identifying anomalous network communication traffic.

BACKGROUND

Computing devices may be configured to transmit communication messages to other computing devices and to receive communication messages from other computing devices via one or more communication networks. In some scenarios, network servers may be configured to monitor communication network traffic. The network servers may be configured to generate or store data records associated with sequences of communication events.

Network communication events among client devices may be stored as a series of data values representing data attributes. In some examples, communication events may be associated with time stamps, destination identifiers (e.g., uniform resource locator (URL), among other examples), content types (e.g., text, image, video, among other examples), or other attributes associated with the event.

SUMMARY

Client devices may be configured to transmit messages to other client devices and receive messages from other client devices via communication networks. The present disclosure describes systems and methods for adaptively identifying anomalous network communication traffic.

Network servers, such as threat detection servers, may be configured to generate or store data associated with sequences of communication events transmitted over time. Over time, network servers may be configured to identify baseline metrics or patterns associated with features or attributes corresponding to sequences of communication events. For example, a network server may identify periodic data characteristics among sequences of communication events or baseline patterns associated with database access requests (e.g., popularity of Internet webpage access requests or online banking access requests), among other examples.

Embodiments described in the present disclosure may include systems and methods configured to generate Kolmogorov complexity approximations associated with data representing sequences of network communication events, and to deduce whether such network communication events may have been generated by a computing agent (e.g., an Internet BOT or programmatic script, among examples) or whether such network communication events may have been generated based on human user input at a client device.

In some embodiments, Kolmogorov complexity may be approximated based on compression metrics associated with encoded data representing time differences between successive pairs of network communication events.

In some situations, malicious actors may generate programmable scripts directed at mimicking human user generated network communication events. For example, malicious actors may create programmable scripts that generate a sequence of network communication events to include jitter-type characteristics, such as variations in timing parameters (e.g., period width, phase, among other examples) associated with a sequence of data representing time differences between successive pairs of communication events.

Whereas some Internet BOTs may generate a sequence of network communication events with regularly spaced time intervals, malicious actors may program Internet BOTs with "60% jitter" so that data associated with the sequence of communication events may yield a low compression metric (e.g., due to presence of intentionally added jitter-type characteristics), thereby causing a greater likelihood that a threat detection server 110 may deduce that the sequence of communication events has a high Kolmogorov complexity. A threat detection server 110 identifying a sequence of communication events being associated with a high Kolmogorov complexity may deduce that such communication events may be human generated events. Such a deduction may be based on an artificially or maliciously generated sequence of communication events.

Programmatically introducing jitter-type characteristics may be based on deterministic signal characteristics or properties. Accordingly, systems and methods disclosed herein may be configured to identify such potentially malicious operations, which may be designed to mimic human user generated network communication events.

Embodiments of the present disclosure include systems and methods configured to determine whether a sequence of communication events is generated by a computing agent based on approximations of Kolmogorov complexity measures. In some embodiments, Kolmogorov complexity may be approximated based on a symmetricity measure associated with the sequence of communication events. Programmatically added jitter characteristics to the sequence of communication events may yield encoded data representing the sequence of communication events having symmetry features about a nominal baseline value. Examples of symmetricity measures will be described herein.

In some situations, command and control type computing agents may programmatically introduce jitter features for circumventing threat detection systems assessing Kolmogorov complexity approximations. Accordingly, embodiments of systems and methods may deduce whether sequences of network communication events are BOT-generated or human user generated in a way that may be agnostic to programmatically introduced jitter features.

Embodiments of the present disclosure may also include systems and methods configured to generate threat prediction values based on a combination of a symmetricity measure and a randomness measure associated with network communication devices. By identifying that a sequence of network communication events may be symmetric about a nominal baseline value and by determining that a randomness level of data representing the sequence of communication events is beyond a threshold value, systems and methods may distinguish nominal computing agent generated (e.g., BOT-generated) communication events from potentially ill-intended computing agent generated communication events. Malicious or ill-intended computing agents may in some scenarios programmatically introduce jitter signals or features into sequences of communication events, whereas non-ill intended computing agents (e.g., Service Account agents) may generate communication events on relatively fixed intervals.

In some embodiments, configuring systems and methods to distinguish BOT-generated communication events from human user generated communication events as a precursor to subsequent threat detection operations may provide data sets representing sequences or channels of network communication events having greater deterministic or structural characteristics. Thus, embodiments of the present disclosure may provide systems and methods configured to conduct threat detection operations based on at least two stages, including: (1) deducing whether a sequence of network communication events was generated by human user input or programmed computing agents based on an entropy approximation measure and symmetricity measure; and subsequently (2) deducing whether a sequence of network communication events deduced as computing agent generated (e.g., BOT generated) may be maliciously generated/ill-intended.

In one aspect, the present disclosure provides a system for adaptively identifying anomalous network communication traffic. The system may include a processor and a memory coupled to the processor. The memory may store processor-executable instructions that, when executed, configure the processor to: obtain data associated with a sequence of network communication events; determine that the sequence of communication events is generated by a computing agent based on a symmetricity measure associated with the sequence of network communication events; generate a threat prediction value for the sequence of network communication events prior-generated by the computing agent based on a combination of the symmetricity measure and a randomness measure associated with the network communication events; and transmit a signal for communicating that the sequence of network communication events is a potential malicious sequence of network communication events based on the threat prediction value.

In another aspect, the present disclosure provides a method for adaptively identifying anomalous network communication traffic. The method may include obtaining data associated with a sequence of network communication events; determining that the sequence of communication events is generated by a computing agent based on a symmetricity measure associated with the sequence of network communication events; generating a threat prediction value for the sequence of network communication events prior-generated by the computing agent based on a combination of the symmetricity measure and a randomness measure associated with the network communication events; and transmitting a signal for communicating that the sequence of network communication events is a potential malicious sequence of network communication events based on the threat prediction value.

In another aspect, a non-transitory computer-readable medium or media having stored thereon machine interpretable instructions which, when executed by a processor may cause the processor to perform one or more methods described herein.

In various aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
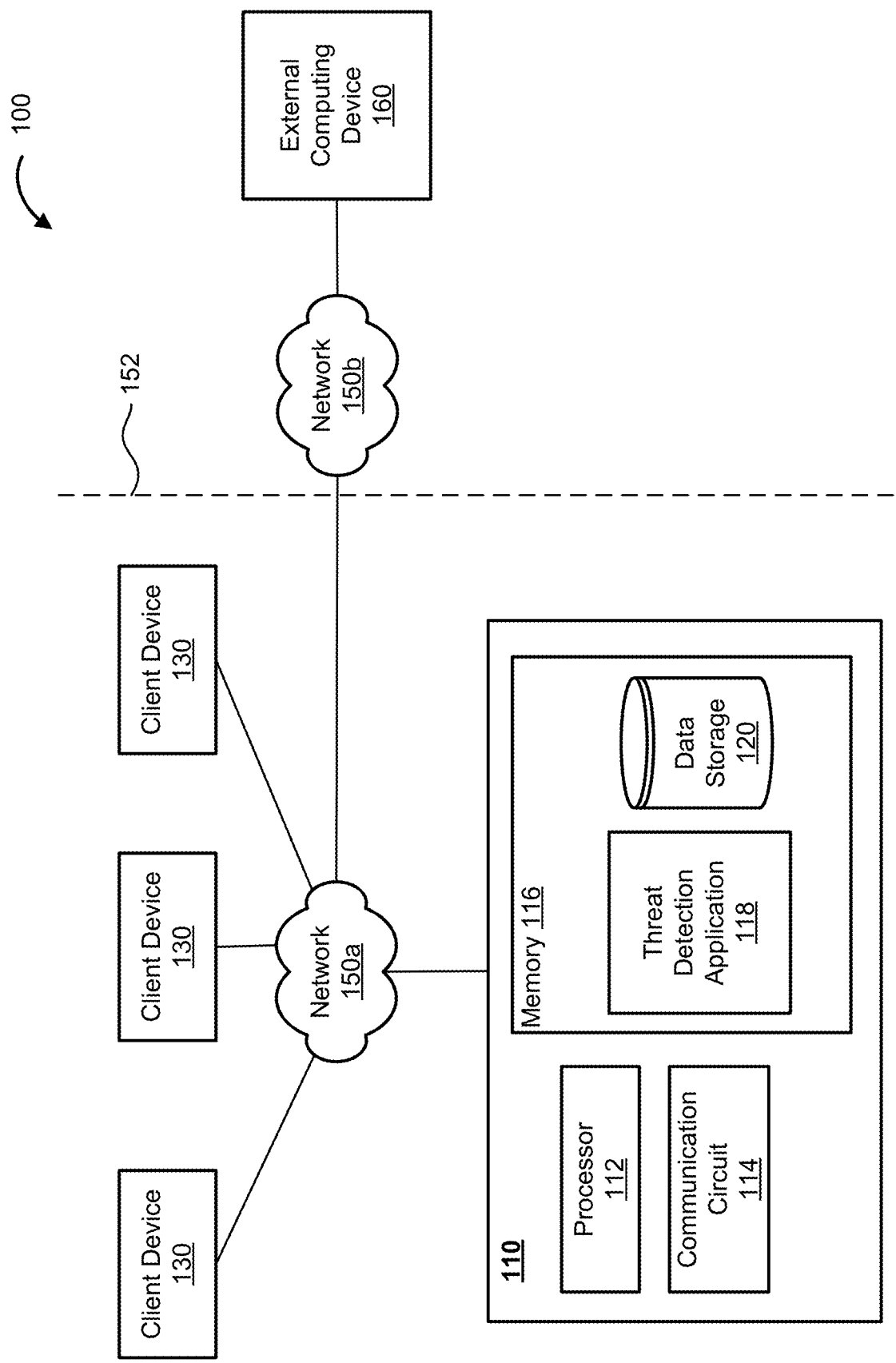
FIG. 1 illustrates a communication system, in accordance with an embodiment of the present disclosure.

Systems and methods for adaptively identifying anomalous communication network traffic are described in the present disclosure. Systems may be configured to detect potential threats within the communication network or to client devices associated with the communication network based on data sets representing sequences of communication events sent to or received from other client devices. In some situations, the data sets may include data message contents, metadata associated with the data message contents, or a combination thereof.

In some situations, potential network threat events may be based on command-and-control operations associated malware beaconing. A network firewall may be a system that monitors and controls, based on security rules, communication events between computing devices "internal" to the firewall and "external" to the firewall. Malware beaconing operations for the purpose of circumventing a network firewall may include communication messages between (i) a computing device external to a protected communication network; and (ii) a computing device authorized to communicate across the protected communication network. Because the network firewall may be a barrier to an unscrupulous user associated with a computing device external to the protected communication network, in some scenarios the unscrupulous user may employ deceptive tactics to have malware installed on computing devices authorized to communicate across the protected communication network. The computing devices having the malware installed may then be configured to transmit communication messages to a command-and-control server associated with the unscrupulous user on a periodic basis, thereby circumventing the network firewall. In some examples, malware may include programmatic scripts for initiating communication messages. As particular sequences of communication events generated by malware may be unexpected or uncharacteristic of a protected communication network, detection of such sequences of communication events may assist with deducing potential threats to the communication network.

In some situations, network threat events may include events that deviate from expected sequences of communication events generated by computing devices associated with Service Accounts. To illustrate, unscrupulous users may employ tactics to take control of computing devices associated with Service Accounts. Because Service Accounts may have access permissions to one or more computing devices within a protected communication network (e.g., configured with administrator account credentials for conducting software maintenance activity or the like on target client devices), unscrupulous users may attempt deceptive tactics to have malware installed on computing devices associated with Service Accounts. As computing devices associated with Service Accounts may generate communication events on a predefined and periodic basis (e.g., known characteristics/behavior), detected changes to expected and periodic patterns of communication events may assist with deducing potential threats to the protected communication network.

In some situations, network threat events may include operations for guessing login credentials (e.g., passwords or the like). Login credential guessing operations may include operations based on brute-force or systematic computing operations. In some embodiments, systems may be configured to detect unscrupulous password guessing operations associated with gaining access to databases or accounts, such as online banking accounts associated with banking institutions, e-commerce shopping websites associated with merchants/retailers, or the like.

In some situations, network threat events may include operations for gaining unauthorized access to user accounts for conducting a series of nominal sized resource transfers to another account (e.g., unauthorized series of modest sized currency transfers from a compromised user account to an unscrupulous user's account). Unscrupulous users may conduct operations to systematically transfer modest sized currency amounts to avoid detection of large value transfers. Systematic transfer operations may be periodically timed or may have other programmatic characteristics. As a communication network may be characterized with expectations of communication event sequences, detection of changes to series of communication events (e.g., series of numerous transactions) may assist with deducing potential threats to the protected communication network. In some embodiments, systems described herein may be configured to detect potentially unauthorized or recurring transactions for the purpose of avoiding detection of large currency transfers to the unscrupulous user's banking account.

In some situations, operations for compromising access to computing networks (e.g., malware beaconing), to computing devices (e.g., unauthorized use of Service Accounts), or to user accounts (e.g., password guessing or unauthorized series of communication messages) may be executed by computing agents. Computing agents may include Internet BOTs, computing devices conducting programmatic scripts, or other types of similar devices for automating tedious or complex tasks. As operations conducted by computing agents may be based programmatic operations having pseudo deterministic characteristics, it may be beneficial to provide systems and methods for detecting network threat events based on data sets representing sequences of communication events transmitted among two or more client devices.

Embodiments of systems and methods described in the present disclosure may include operations for distinguishing communication events generated by computing agents from communication events generated based on human user input, thereby deducing potential threats to the communication network or client devices associated with the communication network. In some situations, communication events generated by computing agents may be nominal events that can be scheduled events (e.g., benign or working as expected). In some other situations communication events generated by computing agents may be based on malicious or anomalous intent. Embodiments of systems and methods described herein may include operations for deducing such malicious or anomalous events among BOT-generated communication events.

Reference is made to FIG. 1, which illustrates a communication system 100, in accordance with an embodiment of the present disclosure. The communication system 100 may include one or more computing devices, such as a threat detection server 110 and one or more client devices 130 in communication, via a protected network 150a, with the threat detection server 110.

The communication system 100 may include an external computing device 160 configured to transmit or receive messages, via an external network 150b and a network firewall 152, to or from one or more client devices 130. The network firewall 152 may be a network security system that monitors or controls incoming/outgoing network traffic based on predefined network security rules. In some embodiments, the network firewall 152 may establish a network "barrier" between the protected network 150a and the external network 150b.

In some embodiments, the threat detection server 110 may include features of a proxy server or any other server device for monitoring communication events, or generating or storing network traffic logs of communication events among any one of the client devices 130 or the external computing device 160. Three client devices 130, a sole threat detection server 110 and a sole external computing device 160 are illustrated in FIG. 1; however, it may be understood that any number of client devices, external computing devices, or threat detection servers arranged in other configurations may be contemplated.

In some embodiments, the threat detection server 110 may be a network communication monitoring device or a proxy server for logging details of transmitted communication messages among computing devices. The threat detection server 110 may log details of communication events occurring within the protected network 150a and/or occurring via the network firewall 152.

In some embodiments, the threat detection server 110 may generate or store proxy or network communication logs. The network communication logs may include data representing communication events among the one or more client devices and external computing devices. In some examples, the network communication logs may include metadata representing the communication events. For examples, communication messages transmitted to a destination device may be associated with a source address, a destination address, a network port number, or a protocol type. For instance, a client device 130 transmitting communication messages for accessing an Internet website (e.g., RBC.com) may be associated with encoded data including: <source address, destination address, port 443, https>. The encoded data set may include attributes such as bytes sent/received, time stamps, uniform resource locator (URL) requested, security action imposed (e.g., allow or block), content type requested (e.g., image, text, video, etc.), or the like. The threat detection server 110 or any other computing device may conduct operations to identify unexpected communication messaging trends that may indicate potential network security concerns.

The networks (150a, 150b) may include wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated. In some embodiments, the networks (150a, 150b) may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks. Although the protected network 150a and the external network 150b are illustrated in FIG. 1 as separate networks, in some embodiments, the networks may be a single network and the network firewall 152 may conduct operations for routing incoming or outgoing communication messages according to predefined security rules.

The threat detection server 110 includes a processor 112 configured to implement processor-readable instructions to conduct operations described herein. For example, the threat detection server 110 may be configured to conduct operations associated with identifying whether a sequence of communication messages or events may have been generated by a computing agent (e.g., BOT, programmatic script, etc.) or a non-computing agent (e.g., computing device generating communication messages based on received user input). In some embodiments, the threat detection server 110 may be configured to conduct operations for detecting whether computing agent generated communication events may be suspicious/a potential threat to network security. In some embodiments, the threat detection server 110 may be configured to conduct operations based on machine learning architectures or models, such as anomaly detection models.

The processor 112 may be a microprocessor or microcontroller, a digital signal processing processor, an integrated circuit, a field programmable gate array, a reconfigurable processor, or combinations thereof.

The threat detection server 110 includes a communication circuit 114 configured to transmit or receive data messages to or from other computing devices, to access or connect to network resources, or to perform other computing applications by connecting to a network (or multiple networks) capable of carrying data.

In some examples, the communication circuit 114 may include one or more busses, interconnects, wires, circuits, or other types of communication circuits. The communication circuit 114 may provide an interface for communicating data between components of a single device or circuit.

The threat detection server 110 includes memory 116. The memory 116 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. The memory 116 may be storage media, such as hard disk drives, solid state drives, optical drives, or other types of memory.

The memory 116 may store a threat detection application 118 including processor-readable instructions for conducting operations described herein. In some examples, the threat detection application 118 may include operations for identifying anomalous or potentially malicious communication events based on entropy approximation measures associated with data representing sequences of communication events. Other operations for detecting network threat events may be contemplated.

The threat detection server 110 includes a data storage 120. In some embodiments, the data storage 120 may be a secure data storage. In some embodiments, the data storage 120 may include data associated with communication events among two or more client devices 130 or external computing devices 160. The data storage 120 may include copies of actual transmitted messages, metadata associated with the transmitted messages, data sets associated with machine learning architecture or anomaly detection models, or other data sets associated with operations described herein.

The client devices 130 or the external computing devices 160 may be computing devices, such as mobile smartphone devices, tablet devices, personal computer devices, or thin-client devices. Communication events among the computing devices via the networks 150 may be logged by the threat detection server 110. The computing devices may include a processor, a memory, or a communication circuit similar to the example processor, memory, or communication circuits of the threat detection server 110.

The threat detection server 110 may be configured to detect network threat events, such as malware beaconing communication events or communication events associated with compromised Service Accounts.

Referring still to FIG. 1, a network firewall 152 may be configured to restrict transmission of communication messages from the external computing device 160 (external to the protected network 150a) to one or more client devices 130 (within the protected network 150a). Because the network firewall 152 may restrict communication events from the external computing device 160 to one or more client devices 130 associated with the protected network 150a, an unscrupulous user may, via deceptive techniques such as transmitting emails with links to malware installation files, etc., attempt to deceive a user of the one or more client devices 130 into installing malware onto the one or more client devices 130. As the one or more client devices 130 may have network access permissions to transmit/receive communication messages via the protected network 150, the unscrupulous user may, via operations of the malware software, conduct one or more series of communication events using the client devices 130 as a proxy. For instance, once malware is installed on the one or more client devices 130, the unscrupulous user associated with the external computing device 160 may configure command-and-control operations associated with malware beaconing via the network firewall 152.

In the present example, malware installed on the one or more client devices 130 "inside" the network firewall 152 may be configured to execute, as a background software process, on a periodic basis command-and-control operations to transmit messages to programmed destination addresses or devices (e.g., the external computing device 160 or other device). By circumventing security access protocols of the network firewall 152 or the protected network 150*a*, an unscrupulous user may gain access to the protected network 150*a*.

In some scenarios, as command-and-control operations associated with malware beaconing may be generated by computing agents, such as BOTs, programmatic scripts, or software programs that may generate sequences of communication events having detectable communication event characteristics, it may be desirable to provide systems and methods of adaptively deducing whether the communication network may be compromised by malware beaconing communications. As will be described, detection of communication messages that may have unexpected characteristics or that may be unexpectedly period/repetitive may be beneficial to deducing threats to communication networks.

As another non-limiting example, the external computing device 160 may be associated with a Service Account, thereby being configured to administer applications or maintenance operations at one or more destination devices associated with the protected network 150*a*. For instance, the external computing device 160 may be associated with a software vendor for administering security or software maintenance/updates at destination devices, such as the one or more client devices 130. In the present example, the external computing device 160 (configured as a Service Account) may be configured to initiate communication events with the one or more client devices 130 (configured as destination devices) on a periodic basis or on the basis of other defined communication event cadence. Because the external computing device 160 may be configured as a Service Account having access credentials to configure or modify the one or more client devices 130, unscrupulous users may compromise the external computing device 160, thereby gaining potential access, via login credentials associated with the Service Account, to the one or more client devices 130.

As communication events associated with Service Accounts may be computing agents, such as BOTs, programmatic scripts, or software programs that may generate sequences of communication events over time having detectable communication event characteristics, it may be desirable to provide systems and methods of adaptively deducing, based on monitoring a sequence of communication events transmitted via the communication network, whether the external computing device 130 of the present example may have been compromised. In some examples, threat detection server 110 may detect changes to communication events that are expected to be periodic or expected to have defined characteristics (e.g., repetitive or deterministic in nature) for deducing a potential network or computing device breaches.

In some embodiments, systems and methods of deducing compromised computing devices based on monitoring sequences of communication events may be based on analysis of proxy logs or communication message logs representing the sequences of communication events. Systems may be configured to generate models based on machine learning architecture for dynamically determining baselines for sequences of messages being transmitted/received by client devices 130 associated with a protected network 150*a*.

Figure 2:
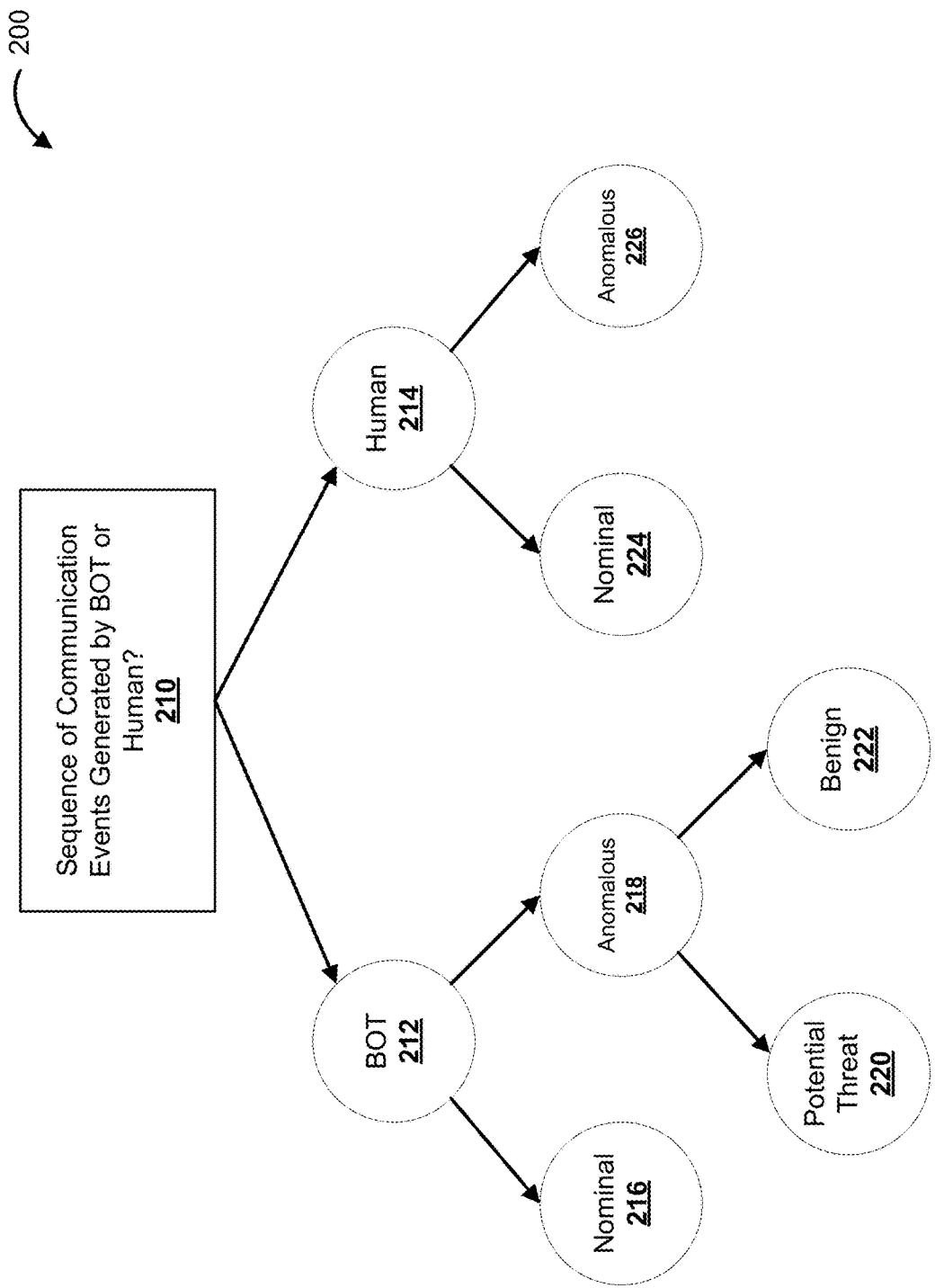
FIG. 2 illustrates a tree diagram illustrating classification categories that may be assigned to sequences of network communication events, in accordance with embodiments of the present disclosure.

Reference is made to FIG. 2, which illustrates a tree diagram 200 for illustrating class categories that may be dynamically associated with sequences of communication events, in accordance with embodiments of the present disclosure.

The threat detection server 110 (FIG. 1) may be configured to obtain data associated with a sequence of communication network events transmitted between at least two client devices over time. In some embodiments, the data associated with a sequence of communication network events may be an encoded data set or may be metadata describing characteristics of the sequence of communication events. As an example, for a sequence of communication messages sent from a source device to a destination device, successive messages may be respectively sent 1 minute, 4 minutes, 5 minutes, 2 minutes, and 7 minutes apart. Accordingly, an encoded data set representing that sequence of network communication events may be "1&4&5&2&7". The ampersand (&) may be a padding value and can be any other character.

Based on the obtained data associated with the sequence of communication network devices, the threat detection server 110 may conduct operations for deducing whether said sequence of communication network events may have been generated by a computing agent 212 (e.g., a BOT) or a human user 214 providing input at a client device. A sequence of communication events that may be identified as generated based on input of a human user 214 may further be categorized as nominal 224 communication events or anomalous 226 communication events.

For example, a sequence of communication events may be associated with a user logging into an Online Banking Account of a banking institution. When successive incorrect login credentials may be received at random times (e.g., without any apparent periodicity), the threat detection server 110 may identify the sequence of communication events as being generated by human user 214 input. That is, the threat detection server 110 may identify the successive incorrect login credentials as being nominal 224 or not a threat if characteristics of the sequence of communication events do not meet a predetermined threshold.

In contrast, when successive incorrect password entries differ by a single incrementing character, the threat detection server 110 may deduce that the successive incorrect login credentials as anomalous 226. Other predefined or combinations of characteristics for identifying whether a sequence of human generated communication events may be a potential threat may be used.

The present disclosure discloses embodiments of the threat detection server 110 configured to deduce network threat events based on sequences of communication events generated by computing agents 212 (e.g., BOTs).

In some embodiments, the threat detection server 110 may deduce whether sequences of communication events are generated by a computing agent 212 or human user input.

For example, the threat detection server 110 may deduce that a sequence of communication events may have been generated by a computing agent based on entropy approximations associated with one or more explainable features or attributes of the sequence of communication events. In some examples, determining that the sequence of communication events is generated by a computing agent may be based on principles of Kolmogorov complexity.

For example, the Kolmogorov complexity of an object may be associated with a size of a shortest program that may generate that object. Sequences of communication events associated with a defined or periodic pattern may be associated with a smaller detected Kolmogorov complexity, thereby implying that the sequence of communication events may have been generated by a computing agent 212 via a programmatic script or other software program.

In comparison, sequences of communication events associated with a less periodic or with less defined patterns may be associated with a larger detected Kolmogorov complexity, thereby implying that the sequence of communication events may have been generated based on human user input. Example methods for detecting whether a sequence of communication events may have been generated by a computing agent 212 or based on human user input 214 are disclosed herein.

In some scenarios, communication events generated by computing agents 212 may not necessarily be anomalous events or potential network threats. For instance, computing agents 212 may be configured to generate a large quantity of communication events for maintenance operations (e.g., software update operations) or network status operations (e.g., managing quantity of network users or network bandwidth), among other examples. It may be beneficial to provide systems and methods for deducing whether communication events generated by computing agents 212 may be nominal 216 (e.g., expected sequences of communication events) or anomalous 218.

In some embodiments, the threat detection server 110 may be configured to identify whether network communication events identified as being generated by computing agents 212 and being anomalous may be: (i) a potential threat 220 to the subject communication network; or (ii) benign communication event 222.

As an example, embodiments of the threat detection server 110 may be configured to identify network communication events generated by malware scripts. In some situations, operations may be conducted based on rules-based policies or filters for identifying malware-type network communication events. In such situations, operations may be configured to examine the packets or message contents of the network communication event, or identify destination domain names (which may be deceptively altered or subject to domain-fronting). In situations where the network communication contents may be encrypted or otherwise obfuscated, rules-based policies or filters may not be optimal for identifying malware-type network communication events. It may be beneficial to provide operations for identifying potential malicious sequences of network communication events based on attributes of the sequence of network communication events.

In some situations, systems may conduct machine learning operations associated with a classification-based approach for identifying potentially malicious sequences of network communication events. The machine learning operations may be based on rules-based boundaries for distinguishing potentially malicious communication events from benign communication events. In some examples, the rules-based boundaries may be based on assigning positive-labels to training data sets. Such rules-based boundaries may lead to operations having biased decision boundaries. In some embodiments, such operations may in effect over-fit rules-based boundaries to training data sets. It may be beneficial to provide operations to reduce overfitting operations for establishing positive-labels or rules-based boundaries for identifying potential malicious sequences of network communication events.

Figure 3:
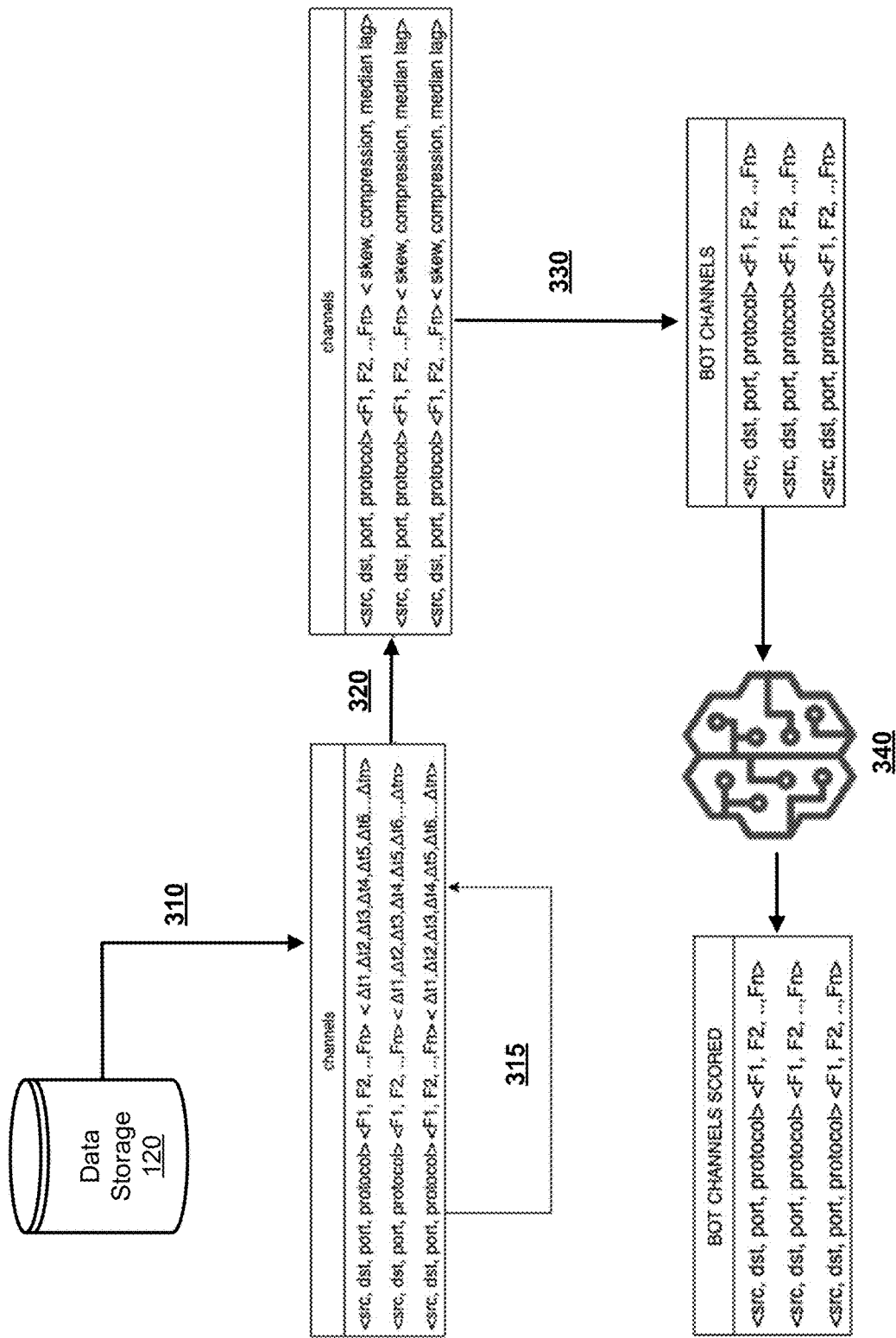
FIG. 3 illustrates a sequence of example operations for adaptively identifying anomalous network communication traffic, in accordance with embodiments of the present disclosure.

Reference is made to FIG. 3, which illustrates a flowchart of a method 300 of identifying potential malicious sequences of network communication events, in accordance with embodiments of the present disclosure. One or more of the computing devices illustrated in FIG. 1 may conduct operations of the method 300. As an example, the threat detection application 118 may include instructions that, when executed, configure a processor to configure the operations of the method 300.

The threat detection server 110 may be configured to generate and store network traffic logs representing sequences of network communication events. The sequences of network communication events may include communication messages sent between or among one or more client devices 130 within the protected network 150a (illustrated in FIG. 1) or among one or more client devices 130 and external computing devices 160 via the network firewall 152 (illustrated in FIG. 1).

In some embodiments, the threat detection server 110 may be configured to generate encoded data sets representing the sequences of network communication events. The encoded data sets may be associated with metadata for summarizing characteristic features or attributes of the sequences of communication events. For example, the encoded data sets may represent periodicity of sequences of network communication events or may represent other data for generating predefined expectations of what typical sequences of communication events may be observed within the protected network 150a.

In some scenarios, computing agents may generate a large percentage of legitimate or expected communication events for transmission via networks (150a, 150b). Legitimate or expected communication events may include communication events for software updates, maintenance, among other examples. In some examples, client devices 130 may generate periodic communication events such as status update messages or network "heartbeat" message, among other examples.

In some embodiments, the threat detection server 110 may store encoded data sets representing sequences of network communication events, and may store data representing expectations of what typical sequences of communication events may be observed among the client devices 130.

At operation 310, the threat detection server 110 may obtain data associated with a sequence of network communication events. For example, the threat detection server 110 may obtain encoded data from the data storage 120 (FIG. 1). In some examples, the threat detection server 110 may compile encoded data based on observing network communication events among various computing devices associated with the networks (150a, 150b) (FIG. 1).

For example, upon obtaining the data representing the sequence of communication events, the threat detection server 110 may compute time differences between successive or adjacent time stamp values, and may generate a string storing a series of time differences between successive time stamps of a sequence of communication events. For example, if successive communication events are sent 1, 4, 5, 2, and 7 minutes apart, the generated relation string may be "1&4&5&2&7". The ampersand (&) may be a padding value. In some other examples, the string may not include any padding values.

In some embodiments, the encoded data representing network communication events may be associated with communication channels. The encoded data may include data such as source address, destination address, network port number, or protocol type, among other data types. The encoded data may include a sequence of data representing time differences between successive pairs of communication events in the sequence of network communication events. Other types or formats of encoded data representing network communication events among computing or client devices may be used.

In some examples, the data may be based on proxy logs, and the proxy logs may include a series of time stamps respectively associated with one of the sequence of communication events. To deduce potential threat events, the threat detection server 110 may conduct operations to detect: (a) changes in an expected pattern of communication events; or (b) unexpected emergence of a pattern of communication events.

Other types of encoded data values or strings associated with other characteristics of successive communication events may be contemplated. For example, the threat detection server 110 may generate encoded data values or strings associated with other features, such as URLs accessed, times of requests, content types requested, among other examples. In some embodiments, the encoded data values or string may represent quantity of data (e.g., bytes) sent/received and distributed over time, and the threat detection server 110 may conduct operations to identify characteristics, such as symmetricity measures, symmetrically distributed based on data skew metrics.

At operation 315, the threat detection server 110 may conduct operations for removing outliers from time-deltas (e.g., data representing time differences between successive pairs of communication events) based on factors such as absolute mean deviation. Other operations of outlier identification may be used.

At operation 320, the threat detection server 110 may conduct operations for analyzing the obtained data associated with one or more sequences of network communication events. In some embodiments, operations for analyzing the obtained data may be associated with determining whether particular network communication event channels may have been generated by computing agents (e.g., Internet BOTs, programmatic scripts, among other examples) for conducting potentially malicious operations across networks communications.

In some embodiments, the threat detection server 110 may generate an approximation of the Kolmogorov complexity associated with respective sequences of network communication events for determining whether the sequence may have been generated by a computing agent or generated by a human user at a client device. In some embodiments, the Kolmogorov complexity of sequences of network communication events may be based on a compression metric associated with stored time differences between successive communication events in a sequence. Other methods of approximating Kolmogorov complexity of sequences of network communication events may be used.

In some embodiments, the threat detection server 110 may conduct operations to quantify how symmetric a communication pattern is about a reference point or base data value. For example, the threat detection server 110 may conduct operations to generate a skew profile associated with data representing a sequence of network communication events. As will be described in further detail herein, the more symmetric a communication pattern is about a reference point, the lower the approximation of Kolmogorov complexity may be.

In some situations, threat detection operations may identify sequences of network communication events as being generated by computing agents (e.g., BOTs, among other examples) based on a Kolmogorov complexity of the sequence. For example, the threat detection operations may include operations to determine how compressible data representing the sequence of network communication events may be. The threat detection operations may deduce that a data that is relatively compressible may be associated with sequences of communication events generated by computing agents, whereas data that is relatively less compressible may be associated with sequences of communication events generated by a human user.

Thus, in some embodiments, at operation 320, the threat detection server 110 may conduct operations to generate compression metrics associated with attributes of the sequence of network communication events. For example, compression ratios may be generated based on time differences between a sequence of time differences between successive pairs of communication events.

To illustrate, the threat detection server 110 may be configured to generate a compression metric for a data string representing time difference between a sequence of communication events:

Data String 1: "30&30&30&30&30&30&30&30&30&30&30&30&30&30"

Data String 2: "30&30&30&30&30&30&20&2&2&6&30&30&30&30&30&30"

The processor may conduct operations based on the following pseudo code:

```
>>> string1_time_compressed=zlib.compress(string1)
>>> string2_time_compressed=zlib.compress(string2)
>>> compress_ratio_string1 = float(len(string1_time_compressed))/len(string1)
>>> compress_ratio_string2 = float(len(string2_time_compressed))/len(string2)
```

For the respective data strings, the processor may calculate a length of the string and a length of a compressed version of the string. Further, the processor may calculate a ratio of: (a) length of the original string; and (b) length of the compressed string. In the above-described example, a determined compression metric for "Data String 1" may be 0.31 and a determined compression metric for "Data String 2" may be 0.5.

To attempt to circumvent or avoid being detected as potential malicious sequence of communication events, some computing agents may be programmed to generate sequences of network communication events in combination with patterns to include jitter-type characteristics. For example, jitter may be a variation of an encoded data set's timing from a nominal value. Jitter may manifest itself as variations in encoded data phase, period, among other characteristics. For example, jitter-type characteristics for a sequence of time differences between successive pairs of network communication events may include added time variation between successive pairs of network communication events.

As an example, a maliciously programmed computing agent may generate communication events having a pattern "call back every 5 minutes with 60% jitter". In such examples, the sequence of communication events may exhibit low compression ratio due to relatively high jitter-type characteristics around a base interval, and may cause the sequence of communication events to be categorized as having high Kolmogorov complexity.

To address such programming methods configured to avoid detection to alter event categorization by example threat detection operations, in some embodiments, the threat detection server 110 may conduct operations to approximate Kolmogorov complexity based on symmetricity measures. In some situations, symmetricity measures may be resilient to jitter characteristics distributed relatively equally around a base interval. In examples of maliciously programmed computing agents within a "command and control" type infrastructure, programmed jitter features may be distributed equally around a base interval or base value.

In some embodiments, at operation 320, the threat detection server 110 may conduct operations for computing skew metrics or a skew profile associated with data representing a sequence of network communication events. That is, the threat detection server 110 may compute skew values (e.g., an example symmetricity measure) of a sequence of time differences between successive pairs of communication events.

Accordingly, the threat detection server 110 may conduct operations for generating evaluative metrics for downstream operations associated with identifying potentially malicious sequences of network communication events.

At operation 330, the threat detection server 110 may conduct operations for identifying communication events or channels potentially generated by computing devices (e.g., BOTs) based on prior-generated evaluative metrics. For example, the threat detection server 110 may apply an optimal threshold to skew profile data (e.g., [−0.5, 0.5]) for identifying sequences of network communication events or channels that may be generated by computing agents (e.g., BOTs, programmatic means, among other examples) or generated by human users. Other threshold ranges may be used.

In some embodiments, the threat detection server 110, at operation 330, may conduct operations to determine whether sequences of network communication events may be generated by computing agents or human users based on compression ratio metrics. For example, the threat detection server 110 may determine that encoded data representing a sequence of communication events having a compression ratio less than 0.6 may be associated with communication events generated by computing agents, at least because there may be a pattern among a sequence of time differences between successive pairs of communication events.

In some embodiments, the threat detection server 110 may include other evaluative metrics for determining whether a sequence of communication events has been generated by a computing agent. For example, the threat detection server 110 may identify whether a sequence of communication events may have been generated by a computing agent or a human user based on whether a compression ratio and a lag metric associated with encoded data representing the communication events meets a threshold value (e.g., compression ratio=<0.6 and lag>=10 seconds). Other evaluative metrics may be used.

Referring briefly again to FIG. 2, upon the threat detection server 110 identifying whether a sequence of network communication events may be generated by computing agents 212 (FIG. 2) or human users 214 (FIG. 2), the threat detection server 110 may further identify whether the subject sequence of network communication events may be nominal or anomalous sequences of communication events.

At operation 340 of FIG. 3, the threat detection server 110 may conduct operations for generating inferences on whether sequences of communication events or channels have been generated by computing agents that are conducting nominal/benign operations or potentially malicious/undesirable operations for generating communication events.

In some embodiments, the threat detection server 110 may associate sequences of communication events having encoded data having symmetric profiles while having random characteristics to likely be associated with computing agents conducting malicious operations. Continuing with the example of obtaining encoded data representing sequences of time differences between successive pairs of network communication events, communication event sequences having relatively high degree of symmetry about a base value in combination with a threshold amount of randomness may more likely be associated with maliciously programmed computing agents, at least because non-malicious computing agents may operate by generating communication events at regular/fixed time schedules.

By evaluating both symmetry and randomness associated with sequences of network communication events, embodiments of the threat detection server 110 may identify computing agents that add artificial jitter (e.g., noise) to communication event sequences for intentionally circumventing methods of network communication threat detection that may be based predominantly on approximations of Kolmogorov complexity.

In some embodiments, the threat detection server 110 may conduct other operations for generating inferences on whether sequences of network communication events are generated by potentially malicious computing agents or non-malicious computing agents based on anomaly classification models. The anomaly classification models may be based on one or more other features of network communication event features.

In some embodiments, anomaly classification models may include unsupervised isolation forest models for extracting attributes associated with prior generated sequences of communication events. In some embodiments, such anomaly classification models may be based on Bayesian networks based on features such as:

quantified upload/download tenancy (e.g., value in range of [1, 1]);
domain popularity, representing a number of users that may be connected to a domain in an analysis window;
duration during which a network communication channel is active in an analysis window;
median time-delta between successive connection attempts;
skew for quantifying symmetricity measure among time differences between communication events (e.g., closer to zero indicates more symmetric);
number of distinct user agents identified in the history of the channel;
number of unique universal resource locator (URL) paths identified in a history of a network communication channel;
number of request/responses in a network communication channel history; total quantity of data downloaded in a network communication channel;

number of unique computing agents used to connect to a domain across a plurality of network communication channels; or compression ratio for quantifying measures of time differences between successive pairs of communication events.

Other features considered for generating inferences on whether sequences of network communications are generated by malicious computing agents may be used.

As disclosed herein, a threat detection server 110 (FIG. 1) may be configured to generate Kolmogorov complexity approximations associated with data corresponding to sequences of network communication events for deducing whether such network communication events have been generated by computing agents (e.g., Internet BOTs, etc.) or by client devices receiving user input.

As an illustrating example, Kolmogorov complexity approximations may be represented by compression metrics associated with encoded data representing time differences between successive pairs of network communication events. In some situations, malicious actors may create programmable scripts directed at mimicking human user generated network communication events.

For example, malicious actors may create programmable scripts that generate a sequence of network communication events that have jitter-type characteristics, such as variations in timing parameters (e.g., period width, phase, among other examples) associated with a sequence of data representing time differences between successive pairs of communication events. Whereas some Internet BOTs may generate a sequence of network communication events with regularly spaced time intervals, malicious actors may program Internet BOTs with "60% jitter" so as to yield a low compression metric (e.g., due to presence of intentionally added jitter-type characteristics), thereby causing a threat detection server 110 to deduce that the sequence of communication events may have a high Kolmogorov complexity. Such a deduction may be based on an artificially or maliciously generated sequence of communication events.

Programmatically introducing jitter-type characteristics may include deterministic characteristics. Such deterministic characteristics may be data-dependent or have periodic characteristics. It may be beneficial to provide systems and methods configured to identify such potentially malicious operations, which may be designed to mimic human user generated network communication events.

Figure 4:
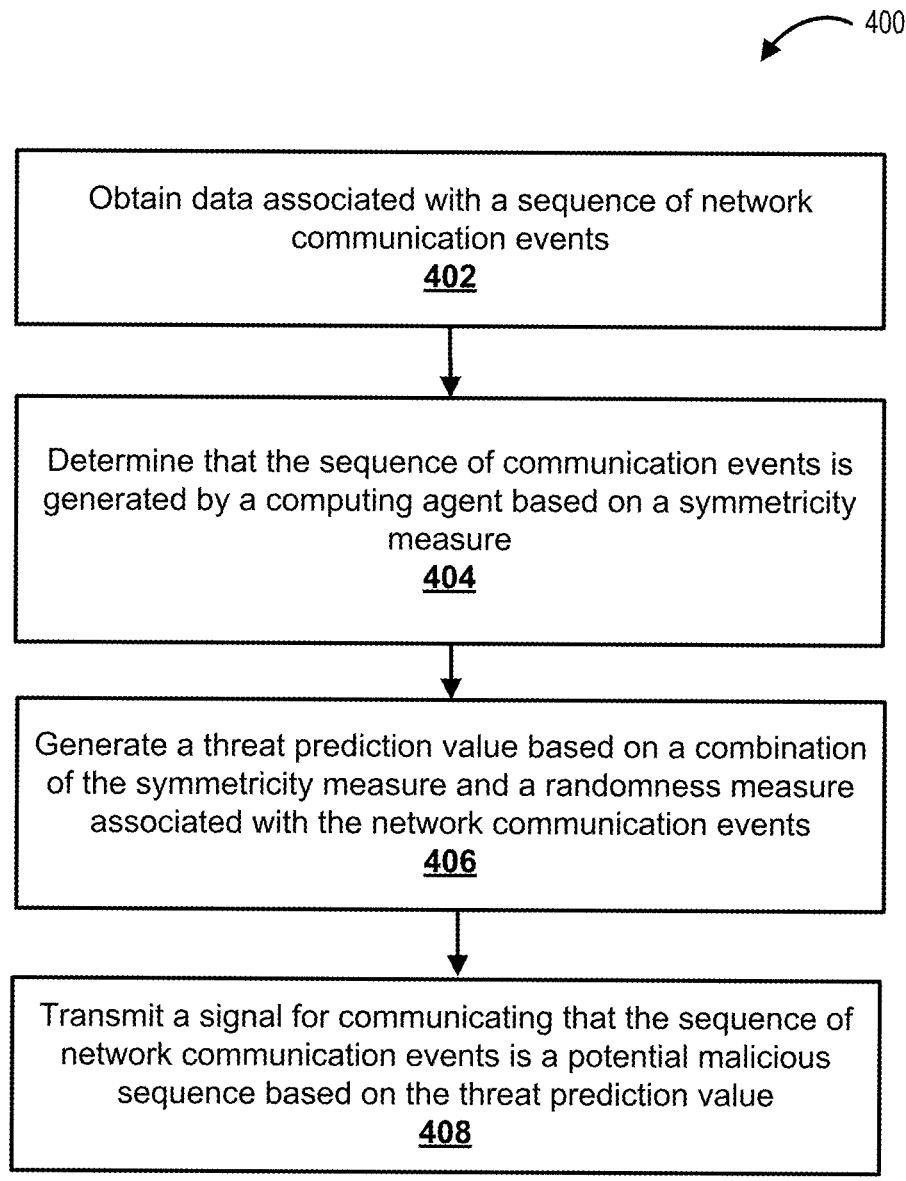
FIG. 4 illustrates a flowchart of a method for adaptively identifying anomalous network communication traffic, in accordance with embodiments of the present disclosure.

Reference is made to FIG. 4, which illustrates a flowchart of a method 400 for adaptively identifying anomalous communication network traffic, in accordance with embodiments of the present disclosure. The method 400 may be conducted by the processor 112 of the system 110 (FIG. 1). Processor-executable instructions may be stored in the memory 116 and may be associated with the threat detection application 118 or other processor-executable applications not illustrated in FIG. 1. The method 400 may include operations such as data retrievals, data manipulations, data storage, or other operations, and may include computer-executable operations.

At operation 402, the processor obtains data associated with a sequence of network communication events. In some embodiments, the data may include contents of the sequence of network communication events. In some embodiments, the data may be encoded data representing the sequence of communication events. For example, the encoded data may be a sequence of data representing time differences between successive or adjacent time stamp values of communication events.

In some embodiments, the encoded data may represent attributes associated with a sequence of network communication events. As another example, the encoded data may represent data size/quantity associated with data packets sent or received in the sequence of network communication events. Other encoded data representing attributes of sequences of network communication events may be used.

At operation 404, the processor may determine that the sequences of communication events is generated by a computing agent based on an entropy approximation measure. For example, the entropy approximation measure may be an approximation of Kolmogorov complexity of the data representing the sequence of network communication events.

In some embodiments, the entropy approximation measure may include a compression ratio associated with the sequence of network communication events. For example, the compression ratio may be a ratio of a length of an original encoded data string and a length of a compressed encoded data string. In some embodiments, encoded data representing an attribute of a sequence of network communication events that may be highly compressed may be associated with relatively repetitive communication event attributes (e.g., events generated by programmatic means). In contrast, events generated based predominately on user input may be associated with encoded data associated with non-repetitive communication event attributes.

Accordingly, in some situations, detecting anomalous sequences of network communication events based solely on compression ratios approximating Kolmogorov complexity may have reduced efficiency when unscrupulous users may add jitter-type characteristics to a sequence of communication events.

To identify potentially anomalous communication events that may programmatically include jitter-type characteristics intended to mimic network events generated based predominantly on user input, in some embodiments, the entropy approximation measure may include determining whether a sequence of network communication event is generated by a computing agent based on a symmetricity measure.

In some embodiments, a symmetricity measure may be an approximation of Kolmorgorov complexity of the sequence of network communication events. The symmetricity measure may represent a quantitative measure of distribution of programmatically added noise signals or characteristics associated with the sequence of network communication events.

As an example, encoded data representing a sequence of communication events having programmatically added jitter-type characteristics may exhibit symmetricity about a base or reference value, at least, because programmatically added jitter-type characteristics may be based on pseudo-deterministic operations. Accordingly, the processor may determine that a sequence of events may be generated by a computing agent (e.g., BOT) when a frequency distribution of encoded data representing attributes of sequences of communication events is symmetric about a base value or a reference value. In some situations, symmetricity may be a measure that may be agnostic to programmatically added noise when the programmatically added noise may be distributed substantially symmetrically about a base or reference value.

In some embodiments, determining a symmetricity measure associated with a sequence of communication events may include determining skew associated with distributions of encoded data representing the sequence of communication events.

As an example, encoded data representing a sequence of network communication events for BOT generated communication events based on "call back messages every 5 minutes" may include a sequence of data representing substantially similar time differences between successive or adjacent time stamp values of communication events. In the present example, the processor may generate an entropy approximation measure for deducing whether the sequence of communication events may have been generated by a BOT or other programmatic script. The encoded data may have a sequence of similar values representing time differences, and may have a compression metric associated with the encoded data being relatively compressible (e.g., high compressibility).

In situations where malicious actors may wish to attempt to circumvent operations based on entropy approximation measures for deducing whether events were BOT generated or human user generated, BOTs may be programmed to generate communication events based on "call back messages every 5 minutes with 60% jitter". The addition of jitter-type characteristics may be introduced such that encoded data associated with communication events may then result in a lower relative compressibility.

To circumvent such anomalous or ill-intended programmatic means, in some embodiments, the processor may generate symmetricity measures associated with encoded data representing sequences of network communication events. In some embodiments, the processor may generate a skew profile associated with the sequence of network communication events for deducing whether the sequence of network communication events was generated by a computing agent or generated by non-computing agents (e.g., based on human user input).

For ease of illustration, sequences of communication events based on "call back messages every 5 minutes with 60% jitter" may provide a low compression ratio due at least to appreciable jitter characteristics about a nominal/base interval. Based predominantly on an entropy approximation measure, the processor may deduce that the sequence may have been generated based on human user input.

However, when the processor conducts operations including determining a symmetricity measure, the processor may determine that the jitter characteristics may provide for symmetric characteristics about the nominal/base interval, thereby providing for a lower Kolmogorov complexity measure.

As programmatically added jitter characteristics may have deterministic characteristics, operations configured to provide deductions associated with the combination of entropy approximation measure and the symmetricity measure may yield a result indicating a lower Kolmogorov complexity, as compared to deductions without considering symmetricity measures. The more symmetric data characteristics may be about a nominal value, the lower the Kolmogorov complexity may be.

Thus, the symmetricity measure may assist with identifying sequences of network communication events as BOT generated, irrespective of added jitter characteristics for mimicking human generated communication events.

At operation 406, the processor may generate a threat prediction value for the sequence of network communication events that were prior-generated by the computing agent based on a combination of: the symmetricity measure and a randomness measure associated with the network communication events.

In some embodiments, generating the threat prediction value for the sequence of communication events may include determining that the randomness measure meets a first threshold value in combination with the symmetricity value meeting a second threshold value. The combination of randomness measure and the symmetricity measure may be associated with identifying a computing agent generating a malicious class of network communication events.

As an example, the symmetricity measure may be a skewness value, where an absolute value of a skewness value less than or equal to 0.5 may indicate that the associated sequence of communication events is likely generated by a computing device or programmatic operations.

In another example, the randomness measure may be a compression metric associated with compressibility of an encoded data set representing attributes (e.g., time delta between communication events). Solely as an illustration, if a compression ratio is less than or equal to 0.6 (e.g., a lower relative number) represents a lesser number of unique time delta values, a greater randomness among frequency of time delta values may be deduced. Other randomness measures to evaluate a sequence of encoded data representing communication events may be used.

In situations where computing agents generate network communication events for legitimate/intended operations (e.g., operating as a Service Account), such communication events may have regular or fixed transmission schedules. BOT-generated network communication events may have relatively low measures of randomness, as compared to communication events generated based substantially on user input.

In situations where computing agents are programmed to generate network communication events for mimicking human-generated communication events (e.g., for malicious intents), programmatic introduction of jitter characteristics may nonetheless provide for symmetric characteristics around a base interval of data representing the network communication events. Further, programmatic introduction of jitter characteristics may lead to an indication of greater randomness associated with the sequence of communication events.

In situations where the processor determines that a frequency distribution of encoded data representing a sequence of communication events is symmetric about a base value while having randomness characteristics may nonetheless have been generated by a BOT or other programmatic means having malicious or ill-intent. Non-maliciously programmed BOTs may generate communication events having relatively fixed schedules (e.g., low randomness characteristics).

Accordingly, the processor may generate a high threat prediction value upon determining that data representing a sequence of network communication events exhibits relatively high randomness while being highly symmetric about a nominal/base interval value. The programmatically introduced jitter characteristics having deterministic characteristics provide randomness while symmetry about a nominal value.

In some embodiments, the processor may generate a low threat prediction value upon determining that data representing a sequence of network communication events exhibit a relatively low measure of randomness. Such sequences of network communication events may be identified as having been generated by computing agents (e.g., BOTs) but potentially for expected or legitimate intentions (e.g., Service Accounts).

In some embodiments, generating a threat prediction value may be based on an unsupervised classification model. The unsupervised classification model may include unsupervised isolation forest models based on data attributes of prior-generated sequences of network communication events. The unsupervised classification models may be anomaly detection models for identifying potentially malicious or ill-intended BOT-generated communication events based on one or more communication event attributes.

In some embodiments, attributes may include at least one of communication network traffic frequency, upload data rate, download data rate, communication destination popularity, or time differences between communication events, among other examples described herein.

In some embodiments, the unsupervised classification models may include Bayesian-based networks based on attributes such as upload/download tendency quantification values, communication domain popularity measures, communication event duration, median time-deltas between successive communication channel connection attempts, symmetricity of time-deltas between successive pairs of communication events, or number of or quantity/size of data packets associated with communication events, among other examples of communication event attributes described in the present disclosure.

At operation 408, the processor may transmit a signal for communicating that a sequence of network communication events is a potential malicious sequence based on the threat prediction value.

In some embodiments, the processor may generate the threat prediction value based on an unsupervised classification model in combination with the symmetricity metric and the randomness metric. For example, the unsupervised classification model may be an unsupervised Bayesian network model for determining the threat prediction value based on one or more additional characteristics of sequences of network communication events.

In some embodiments, the unsupervised classification model may be trained based on prior-generated sequences of network communication events and based on features including upload/download tendency measures from training sequences, unique users associated with domains, median time-delta characteristics between successive communication events, quantity of content data associated with network communication events, among other features.

Figure 5:
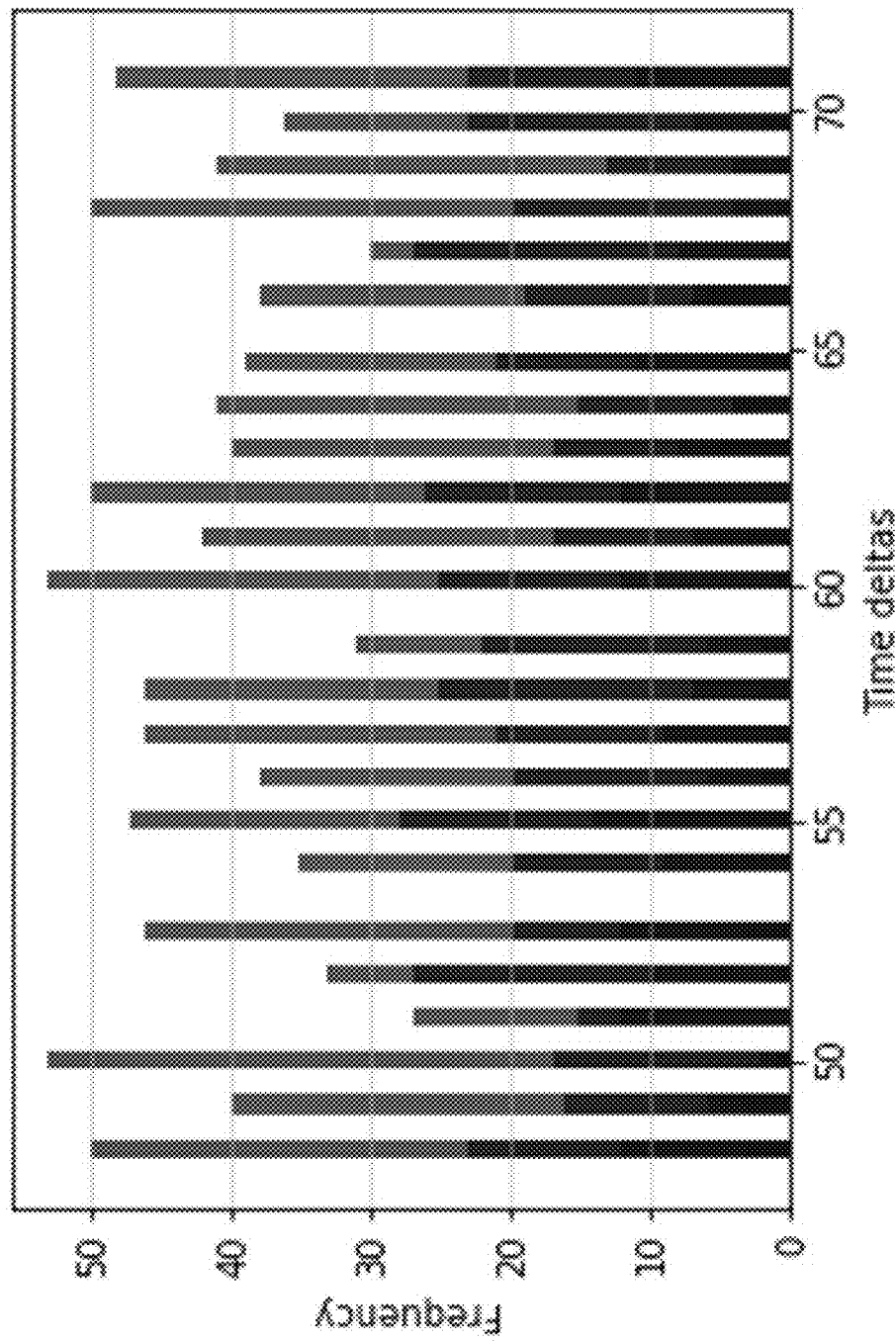
FIG. 5 illustrates a frequency distribution plot of time deltas between a series of pairs of successive communication events, in accordance with an embodiment of the present disclosure.
Figure 6:
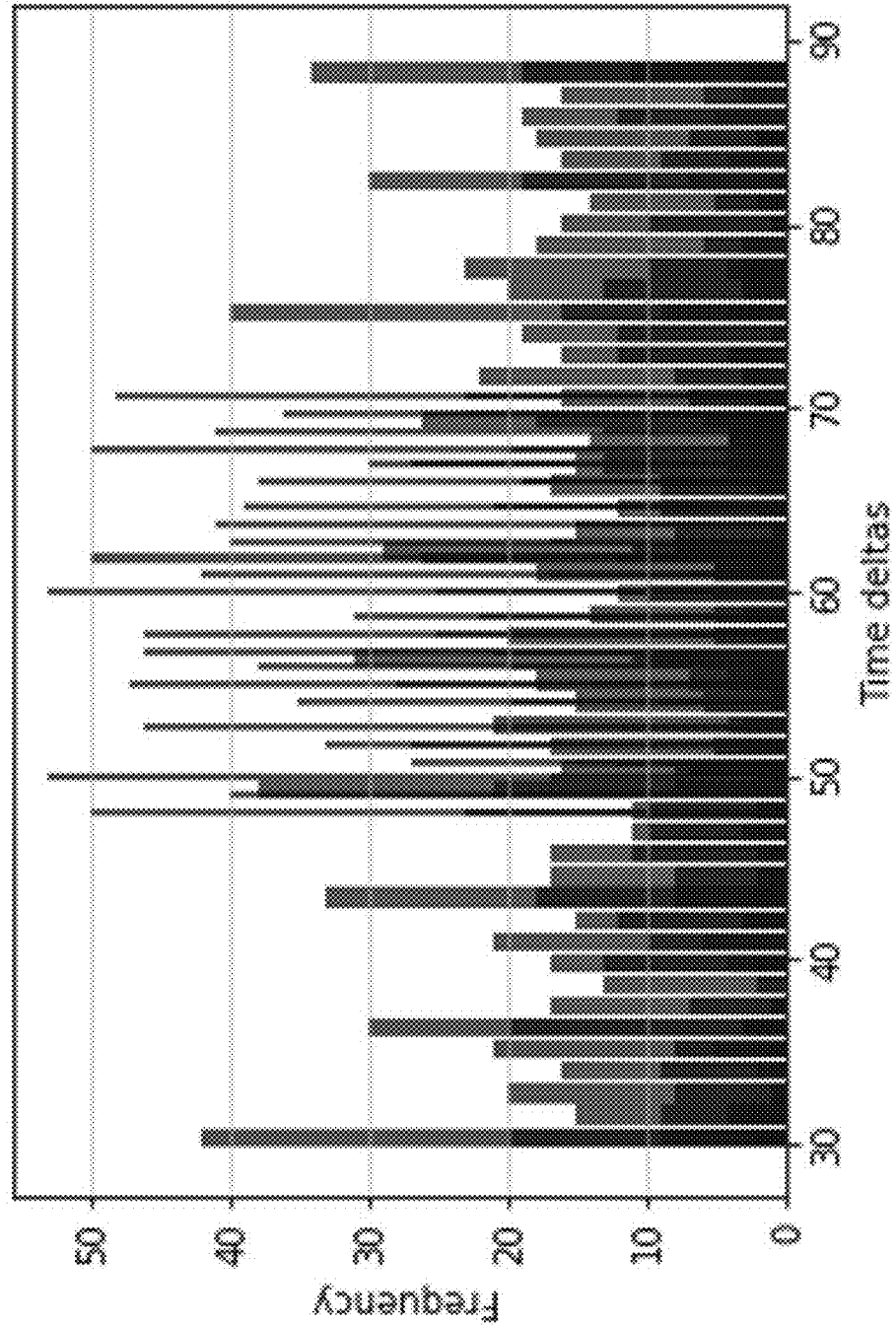
FIG. 6 illustrates a frequency distribution plot of time deltas between a series of pairs of successive communication events, in accordance with another embodiment of the present disclosure.
Figure 7:
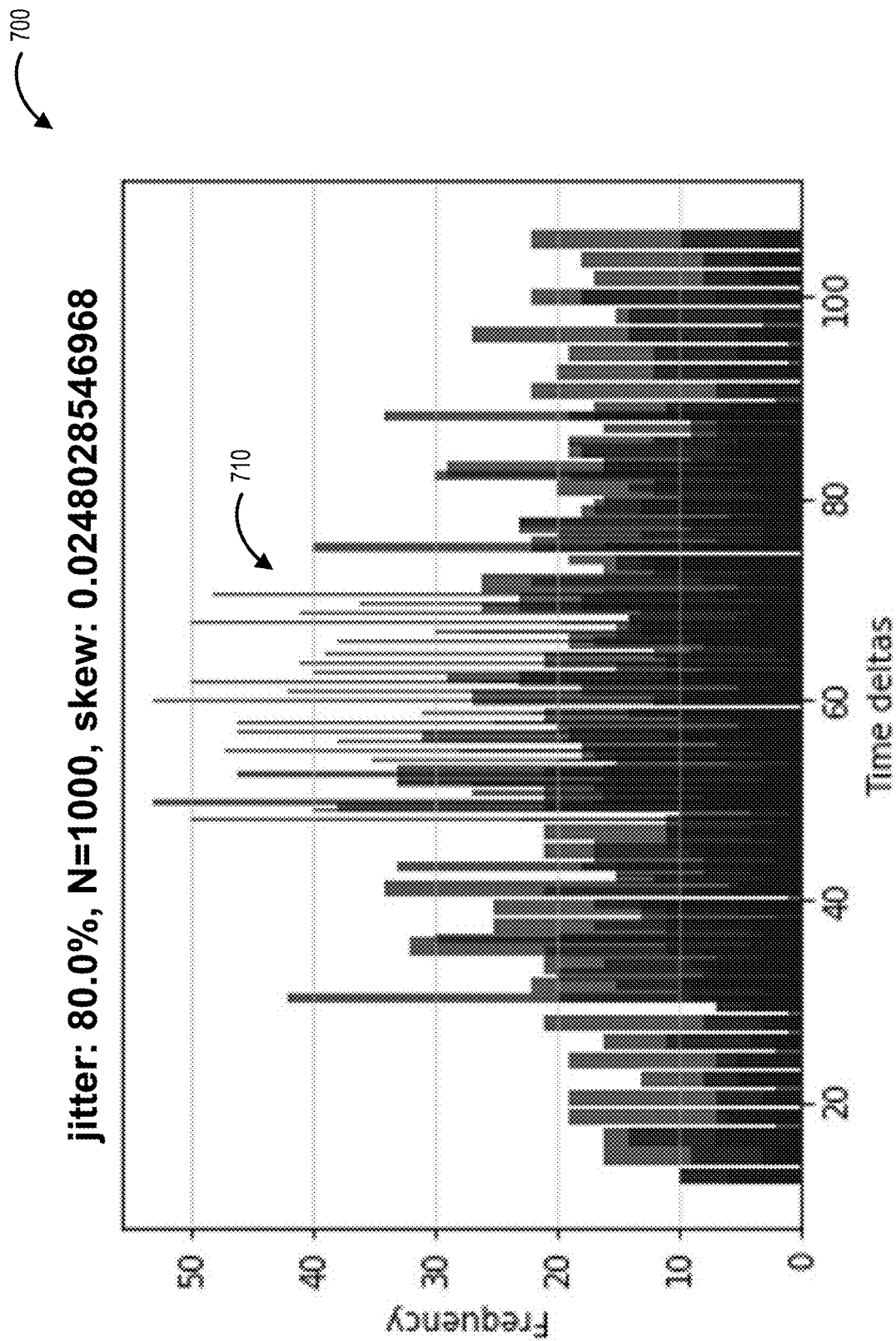
FIG. 7 illustrates a frequency distribution plot of time deltas between a series of pairs of successive communication events, in accordance with another embodiment of the present disclosure.

Reference is made to FIGS. 5, 6, and 7, which illustrate frequency distribution plots associated with encoded data representing attributes of sequences of network communication events, in accordance with embodiments of the present disclosure.

FIG. 5 shows a frequency distribution plot 500 of time deltas between a series of pairs of successive communication events with 20% jitter-type characteristics programmatically added, in accordance with embodiments of the present disclosure.

In FIG. 5, time delta attributes may be on the order of milliseconds, where a time between successive communication events may be in the range of 40 to 70 milliseconds. FIG. 5 shows a frequency plot representing 1,000 time deltas associated with a sequence of communication events, where the generated communication events may have timing parameters including jitter-type characteristics added (e.g., 20% jitter). In some embodiments, jitter-type characteristics may be variations in timing parameters (e.g., period, width, phase, among other examples).

FIG. 6 shows a frequency distribution plot 600 of time deltas between a series of pairs of successive communication events with 50% jitter-type characteristics programmatically added, in accordance with embodiments of the present disclosure. As compared to the frequency distribution plot of FIG. 5, the distribution plot in FIG. 6 includes additional time deltas that add noise-like type of data. Solely for illustration, plot elements representing additional time deltas based on added noise-like characteristics may include encoded data represented by thinner bar graph elements in FIG. 6.

When comparing to the distribution plot in FIG. 5, frequency data associated with greater number of time deltas and with a range of frequencies is shown in FIG. 6. By way of example, the variation of time deltas in FIG. 6 (as compared to that illustrated in FIG. 5) may be represented as relatively thinner frequency bars. The greater occurrence of noise-like type of encoded data (e.g., representing time differences between successive pairs of communication events) may suggest that there may be a greater randomness among the time deltas between successive communication events.

FIG. 7 shows a frequency distribution plot 700 of time deltas between a series of pairs of successive communication events with 80% jitter-type characteristics programmatically added, in accordance with embodiments of the present disclosure. As compared to the distribution plots of FIG. 5 and FIG. 6, additional time deltas are shown that add noise-like type of data. Solely for illustration, plot elements representing additional time deltas based on added noise-like characteristics may include encoded data represented by thinner bar graph elements 710 in FIG. 7.

As may be seen when comparing FIGS. 5, 6, and 7, when a greater quantity of jitter-type characteristics are added to a series of communication events, a symmetricity measure such as skew value associated with the frequency distribution plots may continue to be substantially near or approximately zero.

For example, FIG. 5 illustrates a frequency distribution of time deltas between pairs of communication events having 20% jitter-type characteristics programmatically added, and having a skew value of −0.00329375691085.

FIG. 6 illustrates a frequency distribution of time deltas between pairs of communication events having 50% jitter-type characteristics programmatically added, and having a skew value of −0.0191331505666.

FIG. 7 illustrates a frequency distribution of time deltas between pairs of communication events having 80% jitter-type characteristics programmatically added, and having a skew value of 0.0248028546968.

Accordingly, methods described herein for determining: (a) whether a sequence of communication events have been generated by programmatic operations (e.g., BOTs); and/or (b) determining a threat prediction value may be agnostic to programmatically added noise or jitter-type characteristics, at least, because pseudo deterministic processes for adding noise or jitter-type characteristics may result in a substantially symmetric distribution of jitter-type characteristics around a base value.

In the illustrations of FIGS. 5, 6, and 7, the base or reference value may be a time delta of approximately 60 milliseconds. In some other examples, the base or reference value may be any other value, and may represent a mean value or other baseline value.

Based on a skew value being an estimated measure of asymmetry or symmetry of a distribution about a reference or base value, a processor may conduct operations described herein for identifying whether a distribution of data attributes representing a sequence of communication events may have been programmatically generated by a computing device (e.g., BOT) and whether the programmatically generated sequence of communication events may be anomalous events being ill-intended (e.g., unscrupulous user with intention of intercepting network communication events or misappropriating data by sending network communication events). Operations described herein may be based on a principle that nominal BOTs or computing devices may generate sequences of communication events based on fixed schedules. In contrast, anomalous or ill-intended sequences of communication events may be configured to mimic human-generated communication events to avoid being characterized as BOT-generated communication events, and thus may add jitter-type characteristics to provide a perception of increased randomness among attribute data.

Programmatically generated sequences of communication events based on deterministic or pseudo-deterministic processes may be associated with frequency distributions of data attributes that are agnostic to increased perceived randomness or noise. As illustrated in FIGS. 5, 6, and 7, when a symmetricity measure is generated for approximating Kolmogorov complexity, operations for determining whether a sequence of communication events is generated by programmatic operations may be resilient or agnostic to programmatically added noise characteristics, such as jitter-type characteristics.

Figure 8:
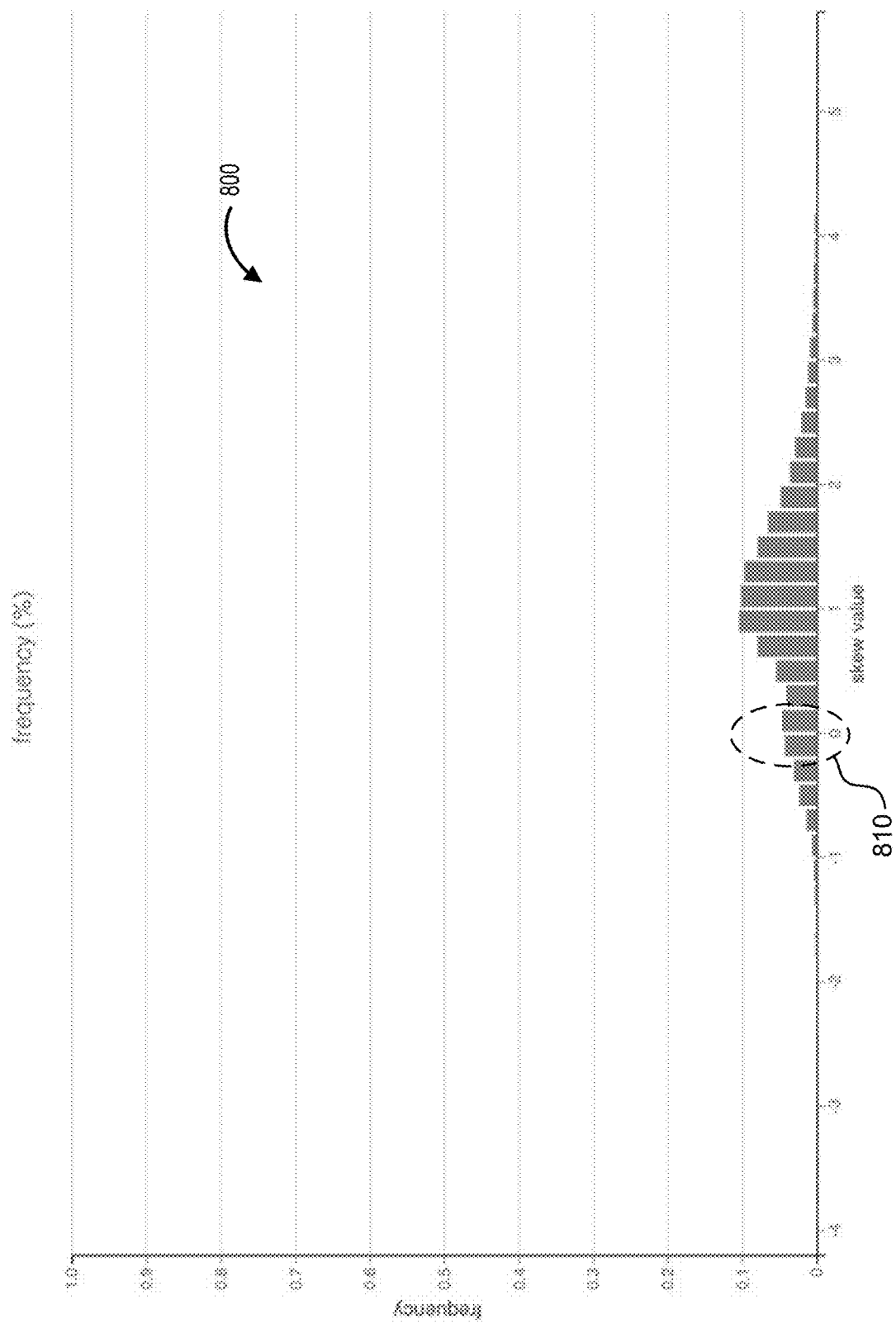
FIG. 8 illustrates a frequency distribution of skew values associated with attributes of communication events for Internet browsing channels, in accordance with embodiments of the present disclosure.

Reference is made to FIG. 8, which illustrates a frequency distribution 800 of skew values associated with attributes of communication events for an Internet browsing channels over a sample period of time, in accordance with embodiments of the present disclosure. The frequency distribution 800 of skew values may be generated based on data sets representing sequences of communication events. The frequency distribution 800 may be configured such that a threat detection server 110 (FIG. 1) may deduce whether sequences of communication events may be associated with anomalous or ill-intended BOT-generated communication events.

For example, in the frequency distribution plot 800 of FIG. 8, distribution values 810 associated with symmetric communication event channels having skew values substantially near or approximately zero may provide an indication of programmatically or BOT-generated communication events. Communication event channels associated with distribution values that are not substantially near zero (illustrated on the frequency distribution plot 800) may represent human-user generated communication event channels or may represent communication event channels having at least partial user-induced communication events. Communication channels or sequences of communication events having skew values that are greater or less than zero may indicate asymmetric distribution of data attributes, which may be associated with communication events generated based substantially on human user input or at least partially based on human user input.

In one example experiment conducted based on systems and methods described herein, 32 known malware network communication event channels were tested. Based on a combination of determined skew values and compression metric values associated with encoded data associated with sequences of network communication events, 27 of the 32 known malware channels were identified to be associated with computing devices (e.g., BOTS). Three "command and control" network communication events were identified as being associated with computing devices (e.g., BOTS).

In another example experiment conducted based on systems and methods described herein, 85 known user-generated communication event channels were tested. Based on a combination of determined skew values and compression metric values associated with encoded data associated with sequences of network communication events, the majority of the communication event channels were identified as based on user-inputs and one of the channels was identified as being based on events generated by a computing device (e.g., BOT).

The above described example experiments are provided to illustrate that the systems and methods disclosed herein may detect anomalous network communication traffic with high success rate or high confidence.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for adaptively identifying anomalous network communication traffic comprising:
   a processor; and
   a memory coupled to the processor and storing processor-executable instructions that, when executed, configure the processor to:
      obtain data associated with a sequence of network communication events;
      determine that the sequence of communication events is generated by a computing agent based on a symmetricity measure associated with the sequence of network communication events;
      generate a threat prediction value for the sequence of network communication events prior-generated by the computing agent based on a combination of the symmetricity measure and a randomness measure associated with the network communication events; and
      transmit a signal for communicating that the sequence of network communication events is a potential malicious sequence of network communication events based on the threat prediction value;
      wherein determining that the sequence of communication events generated by the computing agent is based on compression metric including a compression ratio of the data associated with the sequence of network communication events.

2. The system of claim 1, wherein the symmetricity measure is based on a skew profile associated with the sequence of network communication events for distinguishing the sequence of communication events generated by the computing agent from other sequences of communication events generated by non-computing agents.

3. The system of claim 1, wherein generating the threat prediction value for the sequence of communication events includes:
   determining that the randomness measure meets a first threshold value in combination with the symmetricity measure meeting a second threshold value,
   wherein the combination of the randomness measure and the symmetricity measure is associated with identifying a computing agent generating a malicious class of network communication events.

4. The system of claim 1, wherein the symmetricity measure is an approximation of Kolmogorov complexity associated with data representing the sequence of network communication events.

5. The system of claim 1, wherein the data associated with the sequence of network communication events includes encoded data representing a sequence of time differences between successive pairs of network communication events in the sequence.

6. The system of claim 1, wherein the generated threat prediction value is based on an unsupervised classification model, the unsupervised classification model including an unsupervised isolation forest extracting attributes associated with prior generated sequences of network communication events.

7. The system of claim 6, wherein the attributes includes at least one of communication network traffic frequency, upload data rate, download data rate, communication destination popularity, or time differences between communication events.

8. The system of claim 1, wherein the computing agent includes at least one of an Internet BOT, a programmatic script, or a computing device configured to automate repetitive operations.

9. A method for adaptively identifying anomalous network communication traffic comprising:
   obtaining data associated with a sequence of network communication events;
   determining that the sequence of communication events is generated by a computing agent based on a symmetricity measure associated with the sequence of network communication events;
   generating a threat prediction value for the sequence of network communication events prior-generated by the computing agent based on a combination of the symmetricity measure and a randomness measure associated with the network communication events; and
   transmitting a signal for communicating that the sequence of network communication events is a potential malicious sequence of network communication events based on the threat prediction value;
   wherein determining that the sequence of communication events generated by the computing agent is based on compression metric including a compression ratio of the data associated with the sequence of network communication events.

10. The method of claim 9, wherein the symmetricity measure is based on a skew profile associated with the sequence of network communication events for distinguishing the sequence of communication events generated by the computing agent from other sequences of communication events generated by non-computing agents.

11. The method of claim 9, wherein generating the threat prediction value for the sequence of communication events includes:
   determining that the randomness measure meets a first threshold value in combination with the symmetricity measure meeting a second threshold value,
   wherein the combination of the randomness measure and the symmetricity measure is associated with identifying a computing agent generating a malicious class of network communication events.

12. The method of claim 9, wherein the symmetricity measure is an approximation of Kolmogorov complexity associated with data representing the sequence of network communication events.

13. The method of claim 9, wherein the data associated with the sequence of network communication events includes encoded data representing a sequence of time differences between successive pairs of network communication events in the sequence.

14. The method of claim 9, wherein the generated threat prediction value is based on an unsupervised classification model, the unsupervised classification model including an unsupervised isolation forest extracting attributes associated with prior generated sequences of network communication events.

15. The method of claim 14, wherein the attributes includes at least one of communication network traffic frequency, upload data rate, download data rate, communication destination popularity, or time differences between communication events.

16. The method of claim 9, wherein the computing agent includes at least one of an Internet BOT, a programmatic script, or a computing device configured to automate repetitive operations.

17. A non-transitory computer-readable medium or media having stored thereon machine interpretable instructions which, when executed by a processor, cause the processor to perform a computer-implemented method for adaptively identifying anomalous network communication traffic, the method comprising:

obtaining data associated with a sequence of network communication events;

determining that the sequence of communication events is generated by a computing agent based on a symmetricity measure associated with the sequence of network communication events;

generating a threat prediction value for the sequence of network communication events prior-generated by the computing agent based on a combination of the symmetricity measure and a randomness measure associated with the network communication events; and transmitting a signal for communicating that the sequence of network communication events is a potential malicious sequence of network communication events based on the threat prediction value;

wherein determining that the sequence of communication events generated by the computing agent is based on compression metric including a compression ratio of the data associated with the sequence of network communication events.

18. The non-transitory computer-readable medium or media of claim 17, wherein the symmetricity measure is based on a skew profile associated with the sequence of network communication events for distinguishing the sequence of communication events generated by the computing agent from other sequences of communication events generated by non-computing agents.

* * * * *